(12) United States Patent
Wilner (10) Patent No.: US 7,392,716 B2
(45) Date of Patent: Jul. 1, 2008

(54) PIEZORESISTIVE STRAIN CONCENTRATOR

(75) Inventor: Leslie Bruce Wilner, Palo Alto, CA (US)

(73) Assignee: Endevco Corporation, San Juan Capistrano, CA (US)

( * ) Notice: Subject to any disclaimer, the term of this patent is extended or adjusted under 35 U.S.C. 154(b) by 0 days.

(21) Appl. No.: 11/338,519

(22) Filed: Jan. 23, 2006

(65) Prior Publication Data

US 2006/0117871 A1    Jun. 8, 2006

Related U.S. Application Data

(63) Continuation of application No. 11/000,512, filed on Nov. 30, 2004, now Pat. No. 6,988,412.

(51) Int. Cl.
*G01L 1/18* (2006.01)
*G01L 9/04* (2006.01)

(52) U.S. Cl. .................................. 73/862.627; 73/754

(58) Field of Classification Search ............ 73/754, 73/862.627

See application file for complete search history.

(56) References Cited

U.S. PATENT DOCUMENTS

| | | | | |
|---|---|---|---|---|
| 3,351,880 | A | * 11/1967 | Wilner | 338/6 |
| 3,501,732 | A | * 3/1970 | Wilner | 338/2 |
| 3,995,247 | A | 11/1976 | Kurtz | |
| 4,093,933 | A | * 6/1978 | Wilner | 338/42 |
| 4,498,229 | A | 2/1985 | Wilner | |
| 4,605,919 | A | 8/1986 | Wilner | |
| 4,737,473 | A | 4/1988 | Wilner | |
| 4,793,194 | A | 12/1988 | Wilner | |
| 5,313,023 | A | 5/1994 | Johnson | |
| 5,425,841 | A | 6/1995 | Kurtz et al. | |

(Continued)

OTHER PUBLICATIONS

Krivorotov, N. P., "Diaphragmless Pressure Sensor", Elsevier, Sensors and Actuators A 113, pp. 350-354 (2004).

*Primary Examiner*—Edward Lefkowitz
*Assistant Examiner*—Jonathan Dunlap
(74) *Attorney, Agent, or Firm*—Paul Davis; Goodwin Procter LLP (57) ABSTRACT

A piezoresistive device is provided for sensing mechanical input and converts mechanical movement of at least two relatively movable parts into an electrical output. A silicon substrate is provided that is oriented in the (100) plane and has an n-type impurity. A gap extends across a portion of the substrate. The gap defines the at least two relatively moveable parts. A flexible cross-section connects the at least two relatively moveable parts. The cross-section is made of the same material as the substrate. At least one strain sensitive element is provided on a surface of the silicon substrate, is aligned in a [110] direction and includes a p-type impurity. The strain sensitive element has two end portions interconnected by an intermediate neck portion. The neck portion is supported on a structure that concentrates strain. The structure extends across the gap and has vertical walls that extend to the cross-section in the gap. The structure is made of the same material as the substrate. At least one electrode is electrically connected to the end portions. The at least one electrode detects changes in electrical resistance between the end portions when the neck portion is subjected to stress in a direction of a current through the strain sensitive element that results from the relative movement of the at least two relatively moveable parts.

18 Claims, 4 Drawing Sheets

U.S. PATENT DOCUMENTS

| | | |
|---|---|---|
| 5,526,700 A | 6/1996 | Akeel |
| 5,539,236 A | 7/1996 | Kurtz et al. |
| 5,756,899 A | 5/1998 | Ugai et al. |
| 5,773,728 A | 6/1998 | Tsukada et al. |
| 6,627,965 B1 * | 9/2003 | Tuller et al. ................ 257/415 |
| 6,739,199 B1 | 5/2004 | Nikkel |
| 6,915,702 B2 | 7/2005 | Omura et al. |
| 6,988,412 B1 | 1/2006 | Wilner |
| 7,146,865 B2 * | 12/2006 | Wilner ................ 73/862.627 |
| 2003/0101828 A1 | 6/2003 | Omura et al. |

* cited by examiner

PIEZORESISTIVE STRAIN CONCENTRATOR

CROSS-REFERENCE TO RELATED APPLICATIONS

This application is a continuation of U.S. Ser. No. 11/000,512, filed Nov. 30, 2004, now U.S. Pat. No. 6,988,412 which application is fully incorporated herein by reference.

BACKGROUND

1. Field of the Invention

This invention relates generally to a piezoresistive device, and its methods of use, and more particularly to the formation of geometric shapes for concentrating strain energy into volumes occupied by piezoresistive strain elements in preference to volumes that are electrically inactive.

2. Description of the Related Art

In pressure and acceleration sensors, it is desired to produce a relatively large signal power from a relatively small amount of energy absorbed from the medium. The goal is to minimize the mechanical energy necessary to produce a desired output signal. In pressure sensors, energy is absorbed from the medium as pressure deflects a diaphragm. Generally, a bar deeply notched at the center and its ends is placed across a diaphragm. Gages are placed on the plane surface opposite the notched bottoms.

The strain of the bending bar is concentrated at the bottom of the notches. In acceleration sensors, energy is absorbed from the acceleration field as the seismic mass deflects relative to its reference frame. For example, a structure that is used features gages that are etched free from the substrate over an elastic hinge, a so-called "freed-gage." With the hinge carrying the transverse load and the gages much further from the neutral axis of bending than the outer surfaces of the hinge, the gages become the most highly strained material. In both the acceleration and pressure sensor, efficiency permits high sensitivity via a small physical size.

A common approach taken by manufacturers of transducers has been to create a large field of strained surface and to place onto the more strained areas strain gages of a convenient size. Alternatively, structural means have been used to concentrate strain in piezoresistors. In piezoresistive sensors, signal is produced by changing the resistance of one or more strain-sensitive resistors excited by an electric current. Hence, in a simple plane diaphragm pressure sensor with embedded gages, much of the periphery and a broad area of the center are brought to the state of strain needed to provide signal in the gages. Although gages are placed in areas of highest strain, much of the strain energy is expended in the periphery and center areas which lack strain gages.

In a freed-gage structure only the piezoresistive material sees the full level of strain; the hinge and force-gathering structures are much less strained. Though the freed strain gage was an improvement over previous strain gages, it is still not the optimal structure to detect strain. Manufacturing tolerances impose a minimum cross section on the freed-gage; hence, for the required signal power, some minimum amount of material must be strained. The manufacturing process also imposes an upper limit on the resistivity in the freed gage, which limits the gage factor and thus, the sensitivity of the gage. In addition, heat dissipation limits the length of a device, such that the gages must be stitched back and forth across a gap over a hinge until there is enough total length to give the needed resistance. Thus, there is still a need for a stress concentrating structure that overcomes the short-comings of the freed-gage structure.

SUMMARY OF THE INVENTION

An object of the present invention is to provide an improved piezoresistive device, and its methods of use, for converting mechanical movement into an electrical output.

Another object of the present invention is to provide a piezoresistive device, and its methods of use, for converting mechanical movement into an electrical output, that has a silicon substrate oriented in the (100) plane and has an n-type impurity.

A further object of the present invention is to provide a piezoresistive device, and its methods of use, for converting mechanical movement into an electrical output, that has a 6H silicon carbide substrate that is oriented in the (0001) plane and has a p-type impurity.

Another object of the present invention is to provide a piezoresistive device for converting mechanical movement into an electrical output that allows resistivity to be constrained only by the thermal behavior of a strain sensitive element.

Yet another object of the present invention is to provide a piezoresistive device for converting mechanical movement into an electrical output where the material on a supported strain sensitive element does not need to resist etching.

A further object of the present invention is to provide a piezoresistive device for converting mechanical movement into an electrical output where a strain-concentrating structure is more resistant to buckling under compressive load and more resistant to overload.

These and other objects of the present invention are achieved in a piezoresistive device for sensing mechanical input and converts mechanical movement of at least two relatively movable parts into an electrical output. A silicon substrate is provided that is oriented in the (100) plane and has an n-type impurity. A gap extends across a portion of the substrate. The gap defines the at least two relatively moveable parts. A flexible cross-section connects the at least two relatively moveable parts. The cross-section is made of the same material as the substrate. At least one strain sensitive element is provided on a surface of the silicon substrate, is aligned in a [110] direction and includes a p-type impurity. The strain sensitive element has two end portions interconnected by an intermediate neck portion. The neck portion is supported on a structure that concentrates strain. The structure extends across the gap and has vertical walls that extend to the cross-section in the gap. The structure is made of the same material as the substrate. At least one electrode is electrically connected to the end portions. The at least one electrode detects changes in electrical resistance between the end portions when the neck portion is subjected to stress in a direction of a current through the strain sensitive element that results from the relative movement of the at least two relatively moveable parts.

In another embodiment of the present invention, a piezoresistive device is provided for sensing mechanical input, and then coverts mechanical movement of at least two relatively movable parts into an electrical output. A silicon substrate is provided that is oriented in the (100) plane and has an n-type impurity. A gap extends across a portion of the substrate to define the relatively moveable parts. A flexible cross-section connects the at least two relatively moveable parts. The cross-section is made of the same material as the substrate. At least two strain sensitive elements are provided on a surface of the silicon substrate and are connected in series. Each of the strain sensitive elements is aligned in a [110] direction and is of a p-type-impurity. Each of the strain sensitive elements has two end portions interconnected by an intermediate neck portion. Each of a neck portion is supported on a corresponding structure that concentrates strain. The corresponding structure extends across the gap and has vertical walls that extend to the cross-section in the gap. The corresponding structures are made of the same material as the substrate. At least one electrode is electrically connected to the end portions. The at least one electrode detects changes in electrical resistance between the end portions when the neck portion is subjected to stress in a direction of a current through the strain sensitive element that results from the relative movement of the at least two relatively moveable parts.

In another embodiment of the present invention, a piezoresistive device is provided for sensing mechanical input, and then converts mechanical movement of at least two relatively movable parts into an electrical output. A silicon substrate is provided that is oriented in a (100) plane and has an n-type impurity. A triple-bossed diaphragm is on one side of the silicon substrate. The triple-bossed diaphragm has a rim, a diaphragm that extends across the rim, a central boss and two outer bosses on either side of the central boss and inside of the rim. Four gaps extends across a portion of the silicon substrate to define the last least two relatively moveable parts. Flexible cross-sections extend between corresponding gaps. Two of the gaps are located outside the outer bosses and two of the gaps are located on either side of the central boss and inside of either outer boss. Four strain sensitive element pairs are provided on a surface of the silicon substrate around the gaps. Each of the four strain sensitive elements is aligned in a [110] direction and has a p-type impurity. Each pair has two strain sensitive elements connected in series. Each strain sensitive element has two end portions interconnected by an intermediate neck portion. The neck portion is supported on a corresponding structure that concentrates strain. The corresponding structure extends across the gap and has vertical walls that extend to the cross-section in the corresponding gap. The four strain sensitive element pairs are connected as a bridge circuit. Connections to the corners of the bridge circuit are provide. The connections provide for detection of bridge unbalance caused by changes in the resistance of the strain sensitive elements in response to pressure applied perpendicular to a plane of the device.

In another embodiment of the present invention, a piezoresistive device is provided for sensing mechanical input and converts mechanical movement of at least two relatively movable parts into an electrical output. A substrate of 6H silicon carbide is provided that is oriented in the (0001) plane and is of a p-type impurity. A gap extends across a portion of the substrate and defines the at least two relatively moveable parts. A flexible cross-section connects the at least two relatively moveable parts. The cross-section is made of the same material as the substrate. At least one strain sensitive element is provided at the surface of the silicon substrate. The strain sensitive element has two end portions interconnected by an intermediate neck portion. The neck portion is supported on a structure that concentrates strain. The structure extends across the gap and has vertical walls extending to the cross-section in the gap. The structure is made of the same material as the substrate. At least one electrode is electrically connected to the end portions for detecting changes in electrical resistance between the end portions. This occurs when the neck portion is subjected to stress in a direction of a current through the strain sensitive element that results from the relative movement of the at least two relatively movable parts.

In another embodiment of the present invention, a piezoresistive device is provided for sensing mechanical input and converts mechanical movement of at least two relatively movable parts into an electrical output. A substrate is provided of 6H silicon carbide and is oriented in the (0001) plane and has a p-type impurity. A gap extends across a portion of the substrate that defines the at least two relatively moveable parts. A flexible cross-section connects the at least two relatively moveable parts. The cross-section is made of the same material as the substrate. At least two strain sensitive elements are provided at a surface of the silicon substrate and are connected in series. Each of strain sensitive element has two end portions that are interconnected by an intermediate neck portion. Each neck portion is supported on a corresponding structure that concentrates strain. The corresponding structure extends across the gap and has vertical walls that extend to the cross-section in the gap. The corresponding structure is made of the same material as the substrate. At least one electrode is electrically connected to the end portions. The at least one electrode detects changes in electrical resistance between the end portions when the neck portions are subjected to stress in a direction of a current through the strain sensitive elements. This results from the relative movement of the at least two relatively movable parts.

In another embodiment of the present invention, a piezoresistive device is provided for sensing mechanical input and then converts mechanical movement of at least two relatively movable parts into an electrical output. A substrate of 6H silicon carbide is provided. The substrate is oriented in a (0001) plane and has a p-type impurity. A triple-bossed diaphragm is at one side of the substrate. The triple-bossed diaphragm has a rim, a diaphragm extending across the rim, a central boss and two outer bosses on either side of the central boss and inside of the rim. Four gaps extend across a portion of the substrate and define the relatively moveable parts. Flexible cross-sections extending between corresponding gaps such that two of the gaps are located outside the outer bosses and two of the gaps are located on either side of the central boss and inside of either outer boss. Four strain sensitive element pairs are provided at a surface of the silicon substrate around the gaps. Each pair has two strain sensitive elements connected in series, Each strain sensitive element has two end portions interconnected by an intermediate neck portion. The neck portion is supported on a corresponding structure that concentrates strain. The corresponding structure extends across the gap and has vertical walls extending to the cross-section in the corresponding gap. The four strain sensitive element pairs are connected as a bridge circuit. Electrical connections are provided to the bridge circuit. The electrical connections are configured to measure an unbalance resulting from changes in a resistance of the strain sensitive elements caused by tilting of the outer bosses in response to pressure applied perpendicular to the device.

DETAILED DESCRIPTION

In various embodiments, the present invention provides a piezoresistive device, and is methods of use, that senses mechanical movement and converts that movement into electrical output. This conversion utilizes a strain concentrating structure which supports a strain sensitive element. In various embodiments, the piezoresistive device of the present invention can be incorporated into a variety of different devices. The conversion of relative mechanical motion into electrical output can be incorporated into a variety of transduction devices, including, but not limited to, accelerometers, pressure sensing devices, catheters, microphones, delicate weighing devices, devices to measure relative humidity by the distortion of organic fibers, and the like.

Figures 1A, 1B, 2:
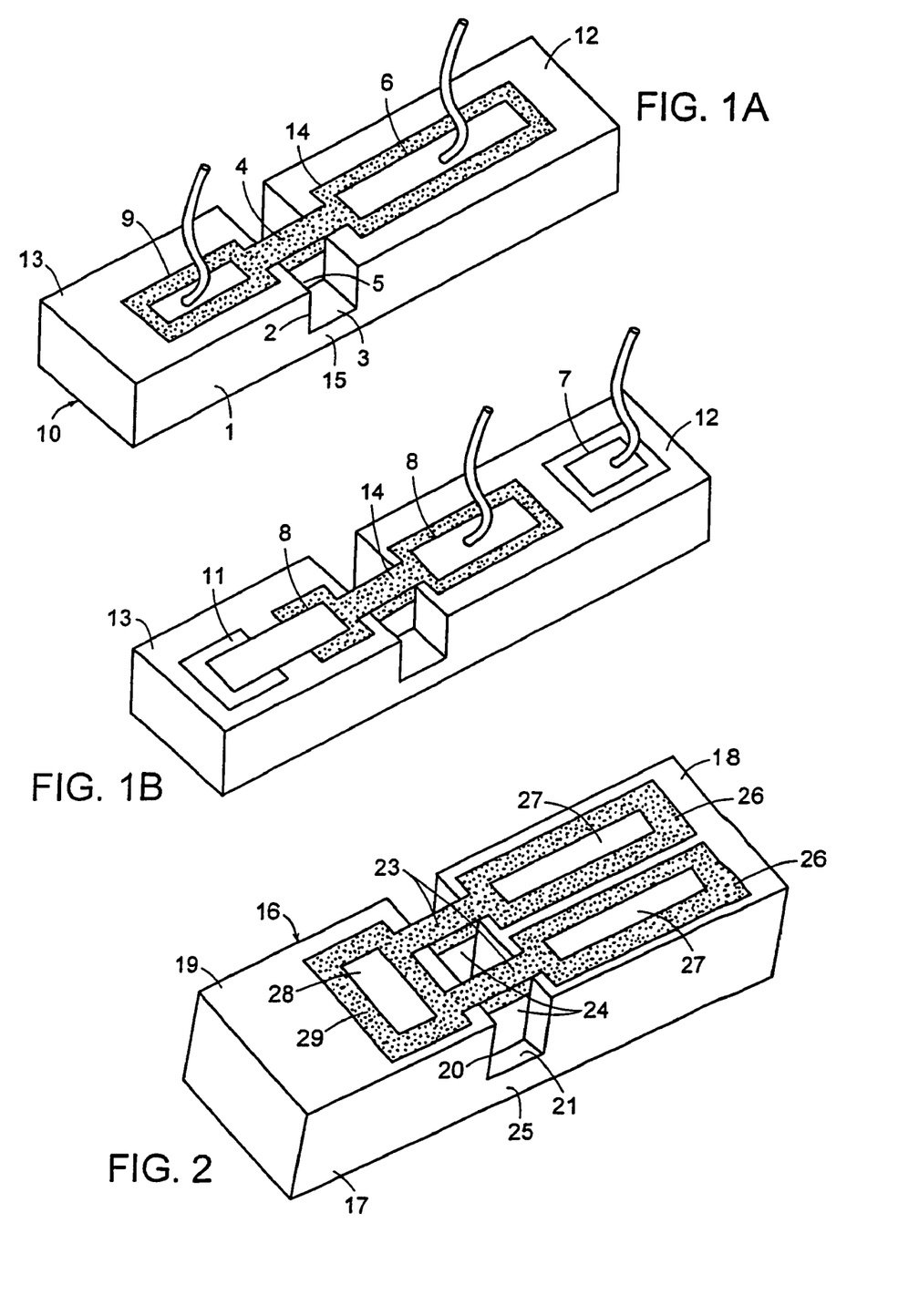
FIG. 1A is a perspective view of one embodiment of a piezoresistive device, of the present invention, with a single strain sensitive element and a strain-concentrating support structure on the substrate.
FIG. 1B perspective view of the FIG. 1A embodiment with both electrical connections on a fixed side of the piezoresistive device.
FIG. 2 is a perspective view of another embodiment of a piezoresistive device, of the present invention, with two strain sensitive elements in series and their corresponding strain-concentrating support structures on the substrate.

Referring to FIG. 1A, in one embodiment of the present invention, a piezoresistive device 10 is provided with a silicon substrate 1, having a gap 2 separating relatively movable substrate ends 12 and 13. Defined within gap 2 is a flexible cross-section 3 that spans gap 2. As can be seen in FIG. 1A, a neck portion 4 of strain sensitive element 14 extends over gap 2, supported on a strain concentrating structure 5. Strain sensitive element 14 is isolated from the bulk of the substrate by a p-n junction. The strain sensitive element 14 can be lightly doped e.g., with boron to a suitable depth such as about 2 microns. Neck portion 4 of strain sensitive element 14, is connected to electrical pads 6 and 9 at each end thereof. Alternatively, in FIG. 1B both electrical connections are on a fixed end of the device, substrate end 12.

Ohmic contacts 7 and 11 are near the end of substrate ends 12 and 13, respectively, having between them the conductivity of the substrate 1. On a movable end of the substrate 1, substrate end 13, piezoresistor 14 is connected to adjacent ohmic contact 8. Functional connections to piezoresistor 14 are then ohmic contacts 11 and 8 on substrate end 13.

As will be appreciated, flexible cross-section 3 defines an elastic hinge 15 that is parallel to substrate 1 and determines the direction of flexibility of movable substrate ends 12 and 13.

Force applied planar to substrate 1 will cause substrate ends 12 and 13 to tilt relative to each other around hinge 15 of cross-section 3, creating strain on strain concentrating structure 5 that is transmitted to neck portion 4 of strain sensitive element 14 and sensed electrically via electrical pads 6 and 9. In particular, changes are detected in electrical resistance when the neck portion is subjected to stress in the direction of current through the strain sensitive element that results in the relative movement of the parts.

Referring to FIG. 2, piezoresistive device 16 is shown with two strain sensitive elements 23 arranged in a manner similar to that described above. Substrate 17 having a gap 20, spanned by strain sensitive elements 23 are supported by strain concentrating structures 24 that are perpendicular to flexible cross-section 21 which defines elastic hinge 25. Both strain sensitive elements 23 can be lightly doped to a depth of about 2 microns. The dual strain sensitive elements 23 have individual electrical pads 26 on substrate end 18 and electrical pad 29 on substrate end 19. Electrical pads 26 have electrical contact terminals 27 positioned thereon, while electrical pad 29 contains electrical contact terminal 28. Electrical contact terminals 28 and 27 may be composed of metal.

Figure 6:
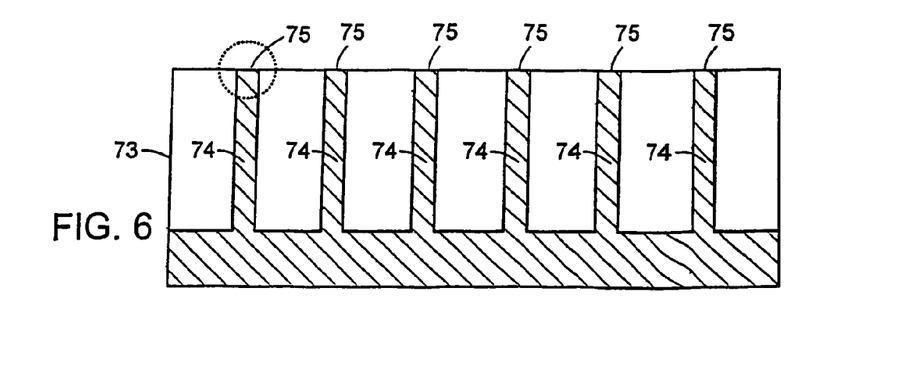
FIG. 6 is a side cross-sectional view of another embodiment of a piezoresistive device, of the present invention, in which six strain sensitive elements are in series and their corresponding strain-concentrating support structures on the substrate.

FIG. 6 shows a cross-section of piezoresistive device 73, which is depicted with six strain sensitive elements 75. Each strain sensitive element is supported on a corresponding strain concentrating structure 74. In this embodiment, strain sensitive elements 75 are preferably heavily doped with boron to a depth of approximately 0.3 microns, allowing the strain sensitive element to have a very small cross-sectional width C2 of about 4 microns, for instance.

In various embodiments of the present invention, in piezoresisitve devices 10, 16 and 73, the substrates 1, 17, 31 and 51 can be made of the materials, and with orientations, set forth in Table 1.

TABLE 1

| Substrate orientation | Subst. type | Piezoresistor type | alignment |
| --- | --- | --- | --- |
| (Single crystal silicon) | | | |
| (110) | n-type | p-type | [111] |
| (100) | n-type | p-type | [110] |
| (100) | p-type | n-type | [100] |
| (Silicon bi-layer, SOI) | | | |
| Any | Any | p-type | [111] |
| Any | Any | p-type | [110] |
| Any | Any | p-type | [100] |
| (Silicon Carbide) | | | |
| (0001) | p-type | n-type | in the (0001) plane |

It will be appreciated that Table 1 is not all inclusive of the suitable materials for substrates 1, 15, 31 and 51, and that other materials can be utilized.

In one specific embodiment of the present invention, in piezoresistive devices 10, 16, and 73, the silicon substrates 1, 17, 31 and 51 are oriented in a (110) plane and have an n-type impurity. Strain-sensitive elements 14, 23, and 75 are aligned in a [111] direction and have a p-type impurity. In another specific embodiment of the present invention, substrates 1, 17, 31, and 51 are of silicon carbide and are oriented in the (0001) plane and are doped with a p-type impurity, and the strain sensitive elements 14, 23, and 75 have an n-type impurity.

Figure 3A:
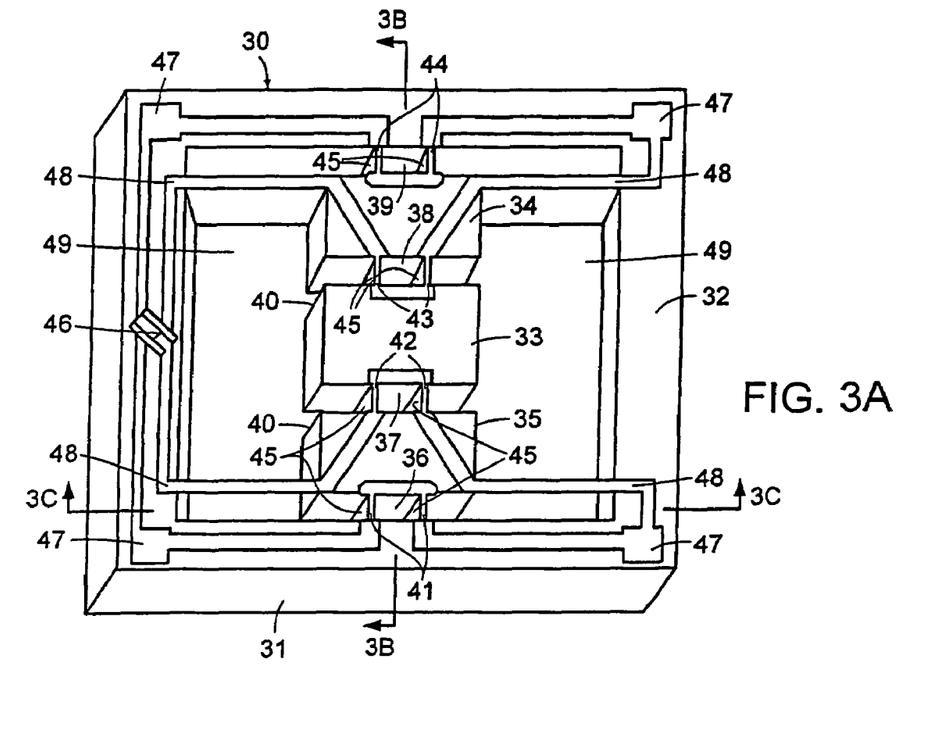
FIG. 3A is a perspective view of another embodiment of a piezoresistive device, of the present invention, with four pair of strain sensitive elements, their corresponding strain-concentrating support structures extending respectively across four gaps that span the substrate, and are connected in a bridge circuit.
Figure 3B:
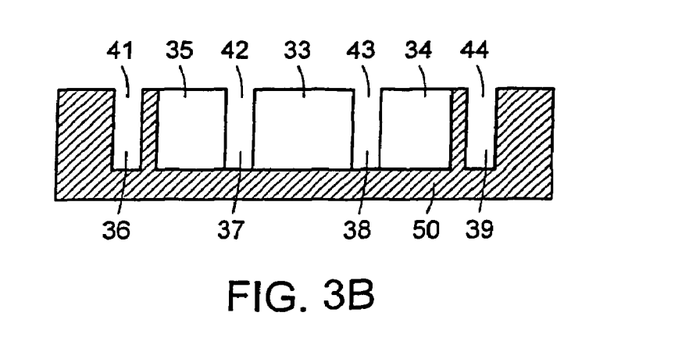
FIG. 3B is a side cross-sectional view of the FIG. 3A embodiment along the 3B line.
Figure 3C:
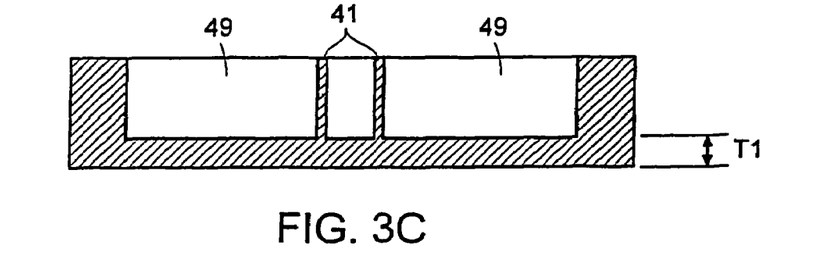
FIG. 3C is a side cross-sectional view of the FIG. 3A embodiment along the 3C line.

Referring now to FIGS. 3A-3C, a transducer is shown which incorporates the stress concentrator of the present invention. The transducer detects motion of the central boss relative to the outer rim, or a pressure difference across the thickness of the transducer causing such relative motion, or an acceleration through the thickness of the transducer causing such relative motion. The transducer 30 is made from silicon substrate 31. Functionally, transducer 30 is composed of four stress concentrators of the type shown in FIG. 2 that are incorporated into a pressure sensor. As can be seen in FIG. 3B, sculpted on one side of substrate 31 is triple-bossed diaphragm 50, composed of central boss 33 and two outer bosses 34 and 35. Four gaps extend across a portion of the substrate 31, such that outer gap 36 is outside of outer boss 35, inner gap 37 is between outer boss 35 and central boss 33, inner gap 38 is between central boss 33 and outer boss 34 and outer gap 39 is outside of outer boss 34. Torsion bar conduction paths 48 run along outer bosses 34 and 35, to terminals 47 on rim 32 that extend across diaphragm 50. In response to pressure applied to one surface, diaphragm 50 will deflect, with central boss 33 moving plane parallel to the rim 32 and outer bosses 34 and 35 tilting relative to rim 32.

Turning to FIG. 3A, defined within each gap are flexible cross-sections 40. Four strain sensitive element pairs 41, 42, 43 and 44 are provided on the surface of substrate 31 around gaps 36, 37, 38 and 39 respectively with each strain sensitive element within the pair supported on stress concentrating structures 45. In one embodiment, strain sensitive elements 14, 23 and 75 are boron lightly doped to a depth of about 2 microns. In another embodiment, the strain sensitive elements 14, 23 and 75 are boron doped to a level of approximately $3 \times 10^{18}$ per cubic centimeter.

The strain sensitive element pairs are connected in an electronic bridge circuit sequence, such as a Wheatstone bridge, the inner strain sensitive elements 42 and 43 wired to terminals 47 at the corners of substrate 31 via torsion bar conduction paths 48 such that adjacent legs of the bridge have opposite senses of strain and change in resistance. Insulated crossover 46 accommodates the physical geometry of the device as it relates to formation of a bridge circuit. As seen in FIG. 3A, trenches 49 are cut on either side of the conduction path to a depth leaving the thickness T1 shown in FIG. 3C. The stress concentrator may be cemented to a support and wired to a circuit, or the support and connecting functions may be provided by a single complex structure applied to the terminal surface.

With pressure applied to the planar surface, deflection of the bosses of the diaphragm occurs as described above, causing outer strain sensitive elements 41 and 44 to become compressed and the inner strain sensitive elements 42 and 43 to become stressed, mechanical movement that the piezoresistive strain sensitive elements detect as a change in resistance. In a balanced bridge circuit, the change in resistance due to deflection unbalances the bridge to provide an electrical output signal.

Figure 4A:
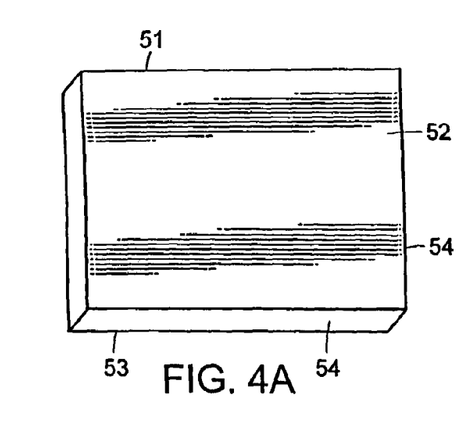
FIG. 4A-4F are perspective views, of one embodiment of the present invention, that illustrate a sequential process of fabricating a sensor wafer of the present invention.
Figure 4B:
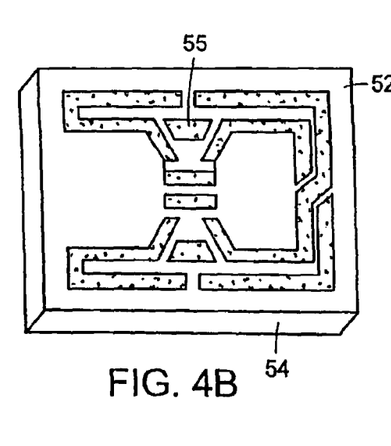

Referring now to FIGS. 4A-4F, a sequence of steps is shown for fabricating transducer 30 in a silicon wafer. The silicon substrate wafer 51 has its main faces oriented (110) and polished very flat, to a totals thickness variation of 2 microns. The [111] direction is identified in the wafer to facilitate aligning the piezoresistive elements to that direction. The wafer is lightly doped n-type. Both of the wafers main faces, 52 and 53, are oxidized at the beginning of the process. As can be seen in FIG. 4B, a preliminary heavy diffusion of boron is made into areas 53, which will serve as p-type conductors on the transducer surface.

Figure 4C:
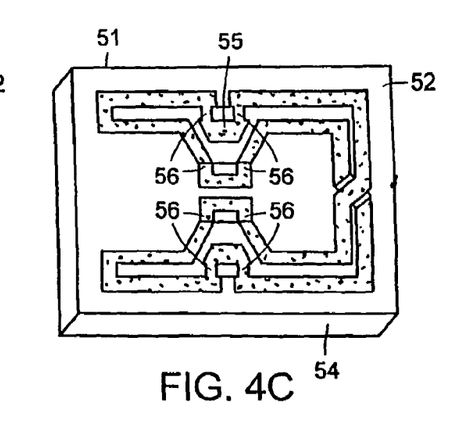
Figure 4D:
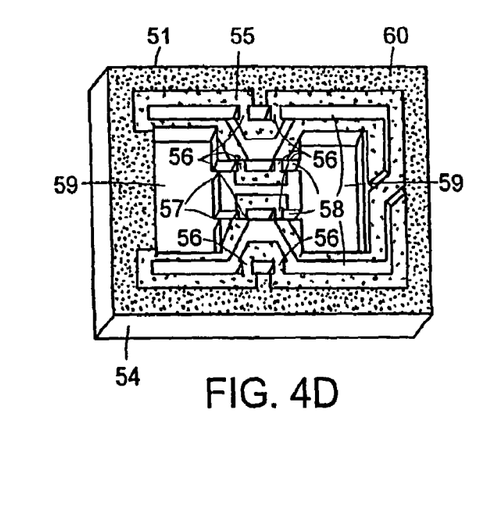

FIG. 4C shows the photo patterning of the surface and opening of the oxide for a light diffusion of boron onto strain sensitive elements 56. In an embodiment, strain sensitive elements 56 can be lightly diffused with at least $3 \times 10^{18}$ boron, to a depth of about 1.1 microns and 265 ohms per square. In FIG. 4D, the surface of substrate 51 is masked against deep reactive ion etching (DRIE) with sputtered aluminum 60, and the DRIE pattern opened in the aluminum to form the diaphragm, stress concentrating structures 57 to support strain sensitive elements 56, flexible cross-sections 58 and trenches 59 on either side of conduction path 55.

Figure 4E:
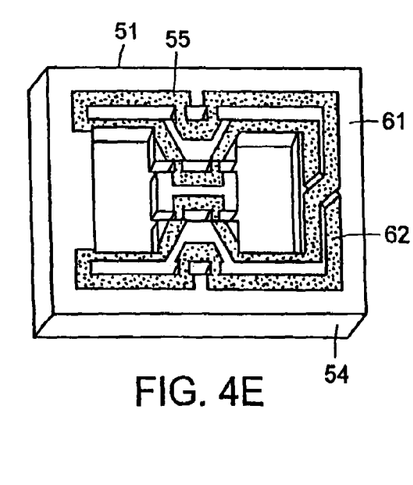
Figure 4F:
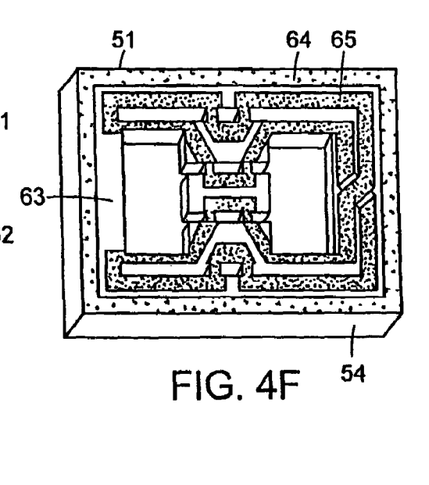

Substrate 51 is etched with DRIE to a final depth that is about 28 percent of the original wafer thickness. As shown in FIG. 4E, sputtered aluminum 60 from FIG. 4D is removed and a thin oxide 61 is grown on the surface. Conduction path 62 is photo patterned and contact holes opened through the oxide. In FIG. 4F, aluminum 63 is deposited on the surface of substrate 51 to a depth of about 0.7 microns and the surface photo patterned to define electrical traces 65 and thermocompression bonding sites 64.

A support wafer necessary for mechanical rigidity and electrical connection is also fabricated. The support wafer is composed of a single silicon crystal of an n-type impurity. To form the complete piezoresistive device, the sensor wafer is aligned with the support wafer and the two wafers thermocompression bonded.

Figure 5A:
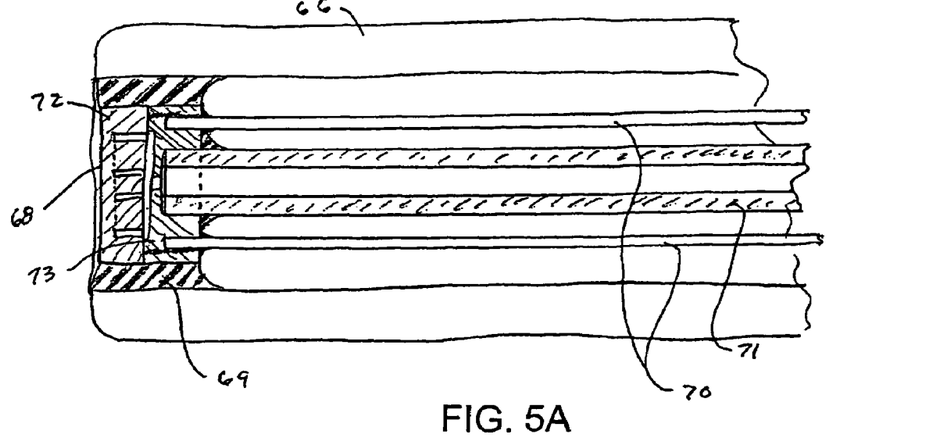
FIG. 5A is a cross-sectional view of another embodiment of a piezoresistive device with a catheter, of the present invention, and used to measure fluid pressure.
Figure 5B:
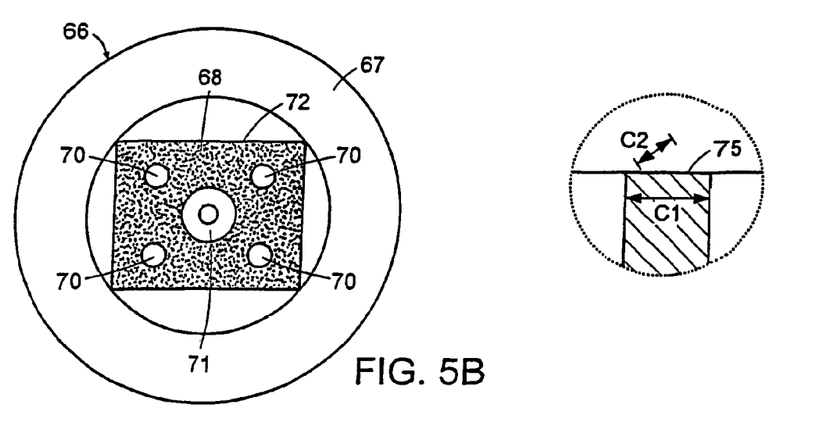
FIG. 5B is the view of a back end of the FIG. 5A embodiment.

Referring to FIGS. 5A and 5B, in one specific embodiment of the present invention, a catheter 66 includes a piezoresistive pressure sensor 72 of any type disclosed above. FIG. 5A is a section along the catheter; FIG. 5B is a section through the catheter behind the sensor. A support member 73 bonded to the sensor 72 couples the sensor to the wires and to a reference pressure tube. A reference pressure tube 71 is epoxy-sealed to the support 73 and thus to the sensor 72. A silicone elastomer 69 seals the pressure sensor 72 into the catheter 66. Silver plated copper wires connect to the terminals of the pressure sensor 72, via the support member 73. The face 68 of the pressure sensor 72 may be coated with a thin film of tantalum to improve its biocompatibility. The catheter may be used to measure fluid pressure within living subjects.

The foregoing description of embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The invention claimed is:

1. A piezoresistive device for sensing mechanical input and converting mechanical movement of at least two relatively movable parts into an electrical auto output, comprising:
   a substrate of silicon carbide oriented in a (0001) plane, wherein silicon carbide is a single crystal material;
   a gap extending across a portion of the substrate defining the at least two relatively moveable parts and a flexible cross-section that connects the at least two relatively moveable parts, the cross-section being made of a same material as the substrate;
   at least one strain sensitive element at a surface at the substrate, the at least one strain sensitive element having two end portions interconnected by an intermediate neck portion, the neck portion being supported on a structure that concentrates strain, wherein changes are detected in electrical resistance when the neck portion is subjected to stress in a direction of current through the strain sensitive element resulting from relative movement, the structure extending across the gap and having vertical walls extending to the cross-section in the gap, the at least one strain sensitive element being made of the same material as the substrate, wherein the at least one strain sensitive element is a layer of silicon carbide; and
   at least one electrode electrically connected to the end portions configured to detect changes in an electrical resistance between the end portions created when the neck portion is subjected to stress in a direction of a current through the at least one strain sensitive element that results from a relative movement of the at least two relatively moveable parts.

2. The device of claim 1, wherein the cross-section defines an elastic hinge parallel to the substrate.

3. The of claim 1, wherein the at least two relatively moveable parts tilt relative to each other about the elastic hinge portion of the cross-section.

4. The device of claim 1, wherein the device is included in at least one of, an accelerometer, pressure sensing device, catheter, microphone, weighing device, and a device to measure relative humidity.

5. A piezoresistive device for sensing mechanical input and converting mechanical movement of at least two relatively movable parts into electrical output, comprising:
   a substrate of silicon carbide oriented in a (0001) plane, wherein silicon carbide is a single crystal material;
   a gap extending across a portion of the substrate defining the at least two relatively moveable parts and a flexible cross-section that connects the at least two relatively moveable parts, the cross-section being made of a same material as the substrate;
   at least two strain sensitive elements at a surface of the substrate and connected in series, each of the at least two strain sensitive elements having two end portions interconnected by an intermediate neck portion across said gap, each neck portion being supported on a corresponding structure that concentrates strain, wherein chances are detected in electrical resistance when the neck portion is subjected to stress in a direction of current through the strain sensitive element resulting from relative movement, the corresponding structure extending across the gap and having verticle walls extending to the cross-section in the gap, the at least two strain sensitive elements being made of the same material as the substrate, wherein each strain sensitive element is a layer of silicon carbide; and
   at least one electrode electrically connected to the end portions configured to detect changes in an electrical resistance between the end portions when the neck portions are subjected to stress in a direction of a current through the at least two strain sensitive elements that results from a relative movement of the at least two relatively moveable parts.

6. The device of claim 5, wherein the cross-section defines an elastic hinge parallel to the substrate.

7. The device of claim 5, wherein the at least two relatively moveable parts tilt relative to each other about the elastic hinge portion of the cross-section.

8. The device of claim 5, wherein six strain sensitive elements are provided on the surface of the substrate of silicon carbide and connected in series.

9. The device of claim 8 wherein each strain sensitive element has a small width of about 4 microns.

10. The device of claim 5, wherein the device is included in at least one of, an accelerometer, pressure sensing device, catheter, microphone, weighing device, and a device to measure relative humidity.

11. A piezoresistive device for sensing mechanical input and converting mechanical movement of at least two relatively movable parts into electrical output, comprising:
   a substrate of silicon carbide oriented in a (0001) plane; wherein silicon carbide is a single crystal material;
   a triple-bossed diaphragm on one side of the substrate the triple-bossed diaphragm having a rim, diaphragm extending across the rim, a central boss and two outer bosses on either side of the central boss and inside of the rim;
   four gaps extending across a portion of the substrate defining the at least two relatively moveable parts and flexible cross-sections extending between corresponding gaps such that two of the gaps are located outside the outer bosses and two of the gaps are located on either side of the central boss and inside of either outer boss;
   four strain sensitive element pairs provided at a surface of the substrate around the gaps, each pair having two strain sensitive elements connected n a series, each of a strain sensitive element having two end portions interconnected by an intermediate neck portion, the neck portion being supported on a corresponding structure that concentrates strain, wherein changes are detected in electrical resistance when the neck portion subjected to stress in a direction of current through the strain sensitive element resulting from relative movement, the four strain sensitive element pairs extending across the gap and having vertical was extending to the cross-section in the corresponding gap, the four strain sensitive element pairs connected as a bridge circuit, wherein each strain sensitive element is a layer of silicon carbide;
   electrical connections to the bridge circuit configured to measure an unbalance resulting from changes in a resistance of the four strain sensitive element pairs caused by tilting of the outer bosses in response to pressure applied perpendicular to the device and
   a support a single, crystal material and configured to provide mechanical rigidity and electrical connection.

12. The device of claim 11 wherein the cross-section defines an elastic hinge parallel to the substrate.

13. The device of claim 11, wherein the at least two relatively moveable parts tilt relative to each other about the elastic hinge portion of the cross-section.

14. The device of claim 11, further comprising an insulated crossover at the gage level on the substrate such that the strain sensitive elements are connected to terminals at the corners of the rim in a bridge circuit sequence such that adjacent legs of the bridge have opposite senses of strain.

15. The device of rim 11, further comprising a torsion bar conduction path from the tilting boss to the terminal on the rim.

16. The device of dawn 11, further comprising a reference cavity sealed by thermocompression bonds to capture a reference pressure.

17. The device of claim 11, wherein the strain sensitive elements are sealed to a surface mount terminal by thermocompression bonds.

18. The device of claim 11, wherein the device is included in at least one of, an accelerometer, pressure sensing device, catheter, microphone, weighing device, and a device to measure relative humidity.

* * * * *